May 23, 1967 B. L. BLEDSOE 3,321,224
TWIN DISK CORD HOLDER UNIT
Filed April 14, 1965 2 Sheets-Sheet 1
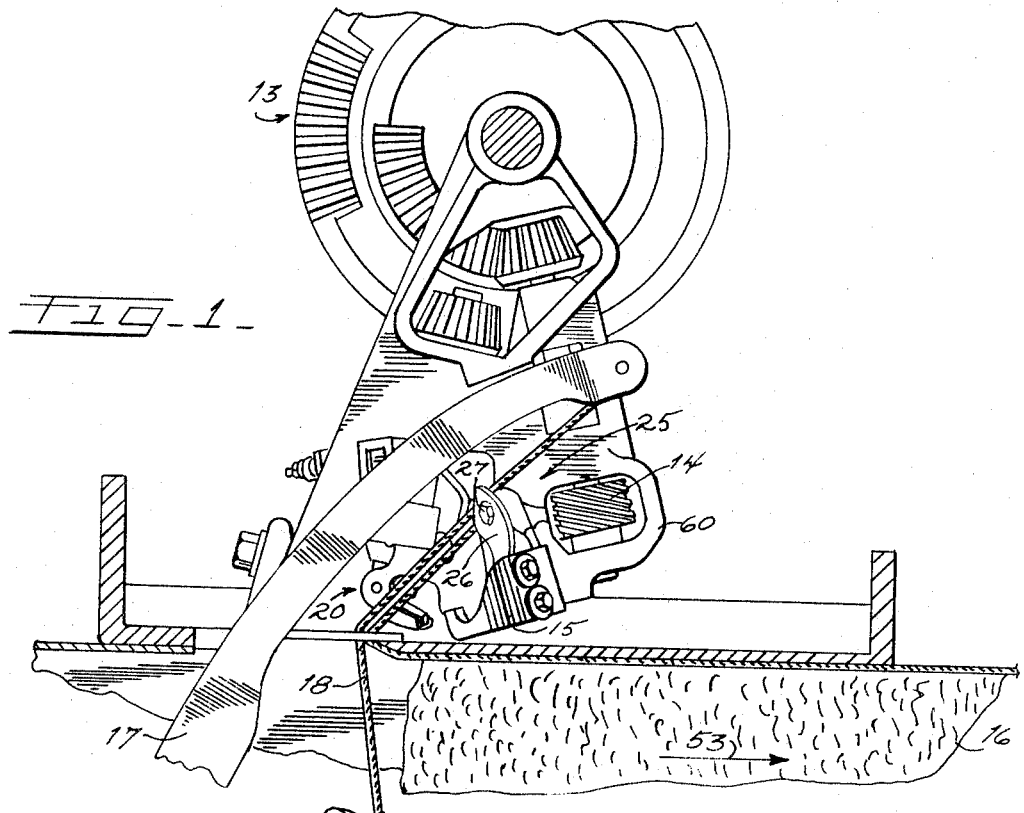
INVENTOR.
BOBBY LYNN BLEDSOE
BY
Ralph Alvey
ATT'Y.

May 23, 1967
B. L. BLEDSOE
3,321,224
TWIN DISK CORD HOLDER UNIT
Filed April 14, 1965
2 Sheets-Sheet 2
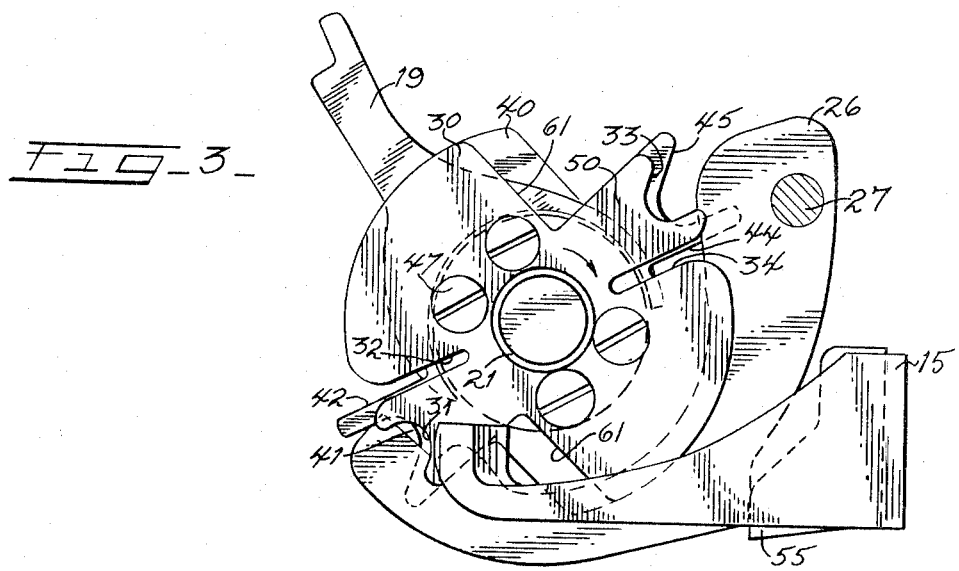
FIG-3-
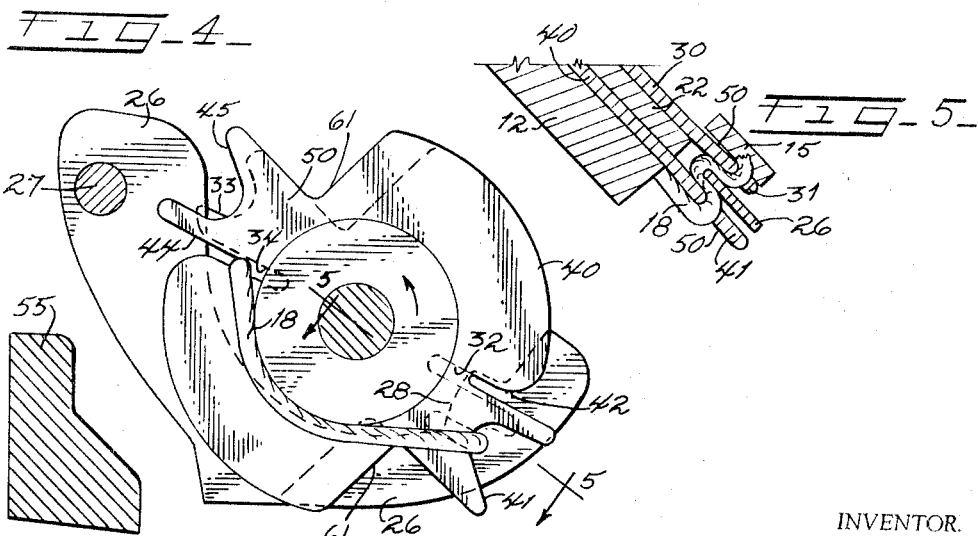
FIG-4-
FIG-5-
INVENTOR.
BOBBY LYNN BLEDSOE
BY
Ralph Alwy
ATT'Y.

United States Patent Office 3,321,224
Patented May 23, 1967

3,321,224
TWIN DISK CORD HOLDER UNIT
Bobby Lynn Bledsoe, Stillwater, Okla., assignor to International Harvester Company, Chicago, Ill., a corporation of Delaware
Filed Apr. 14, 1965, Ser. No. 448,122
5 Claims. (Cl. 289—14)

This invention relates generally to a twin disk cord holder for a hay baler twine binding mechanism. In particular, the disks of the cord holder include novel means for maintaining an effective grip on the baling twine regardless of wear of the cord holder or variations in the thickness of the twine strand.

Wear of the disks and keeper blade of a cord holder is caused by repeated rubbing of twine across the surfaces of these parts and by the abrasive action of foreign matter in the hay being baled. Because the spacing between the disks and the keeper blade is fixed, wear of these parts renders them less able to grip the twine. Hay being forced against the twine by the baler plunger is therefore able to pull the twine loose from the cord holder and cause a mis-tie.

Variations in the thickness of the twine strand exist in any one ball of twine and between different commercial grades of twine. In the case of such variations, the fixed spacing between the cord holder disks and the keeper blade either causes a malfunction of the cord holder or prevents the ready use of another grade of twine. When the thickness of the twine in a ball varies, undersize twine pulls loose from the cord holder; while oversize twine jams in the cord holder and breaks when the keeper blade pulls in to grip it. For different commercial grades of twine, the spacing of the cord holder disks must be adjusted by the addition or subtraction of shims according to the caliper of the twine.

The cord holder forming this invention is able to exert an effective grip on the twine regardless of wear of the cord holder parts, difference in caliper of various commercial grades of twine, and inherent variations in the thickness of the strand of twine in a ball. This versatility is obtained by giving the portions of the cord holder disks containing the wide twine slots the shape of a leaf spring. The leaf spring shape allows a portion of the disk to flex in response to variations in twine size.

Objects

Various objects are attained with the present cord holder. A principal object is to provide a cord holder able to function properly under a greater variety of adverse operating conditions. Another principal object is to provide a versatile cord holder able to use different commercial grades of twine without adding or removing shims. Another object in this regard is to provide a cord holder wherein there is less need to remove shims from between the cord holder disks to compensate for wear of the cord holder parts. A further object is to provide a cord holder able to adjust to variations in the thickness of a twine strand. An additional object is to provide a cord holder having a longer life because of its greater tolerance for wear of the cord holder parts. Other objects are to provide a cord holder capable of handling both shipper grade and standard grade twine without resetting of the cord holder parts, and to provide a cord holder that does not damage oversize twine.

Drawings

The best mode contemplated for carrying out this invention is shown in the drawings, where:

FIG. 1 is a side elevation of a knotter assembly mounted on the top side of the baling chamber of a hay baler;

FIG. 2 is an exploded view of the cord holder unit of the knotter assembly of FIG. 1;

FIG. 3 is a view of the front of the cord holder unit of FIG. 1 along a line of sight normal to the disks, showing the location of the novel leaf spring sections on the disks;

FIG. 4 is a rear view similar to FIG. 3 showing the bale end of a strand of twine gripped in the cord holder; and FIG. 5 is a section taken on line 5—5 of FIG. 4, showing the cord holder disks flexed by oversized twine.

Description

A typical binding mechanism for a baler comprises (FIG. 1) a needle 17 for passing twine 18 around a bale 16 to a cord holder 25, a billhook assembly 20 for forming a knot in the twine, and a mechanism 13 for driving the knotter unit. As binding mechanism in general are old (see U.S. Patent No. 3,101,963), only the novel portions of cord holder 25 will be described in detail here.

The cord holder unit 25 (FIGS. 1-2) holds the twine while bale 16 is being formed and bound. The cord holder assembly shown is a two-stage, twin-disk device and comprises (FIG. 2), a pair of cord holder disks 30 and 40, a keeper blade 26, a twine-end cleaner 19 (FIG. 3), a hub 12, a spacer 22 and a drive shaft 37 carrying a gear 38.

The parts of the cord holder unit 25 (FIG. 2) are assembled in the following manner: Shaft 37 is journalled in a bearing in frame 60, the gear 38 on shaft 37 meshing with a gear 14 of the drive mechanism 13. Hub 12, which is pinned onto shaft 37, has a sleeve 21 on one end. The periphery of the sleeve 21 serves as a seat for the rear disk 40, spacer 22, front disk 30, and the twine end cleaner 19 (FIG. 3). The twine end cleaner 19 extends between the two disks 30 and 40 and has at its inner end a crescent-shaped portion that fits around the diameter of the spacer 22. Any fragments of twine that wind around the spacer are removed by the twine end cleaner 19 as the spacer rotates past the point of the crescent-shaped end. Shims (discussed below) may also be placed on the face of spacer 22 to vary the spacing between the front and rear disks. The disks 30 and 40 and spacer 22 are fastened to the hub 12 by screws 47, screw holes being provided in the various ports for that purpose. Keeper blade 26, pivoted on pin 27, extends around the spacer 22 on the side thereof opposite the twine end cleaner 19. Pivoting action of the keeper blade about pin 27 is limited inwardly by the spacer 22 and outwardly by abutment 55 (FIG. 4) on frame 60. Projection 28 towards the outer end of the keeper blade imposes a holding action (discussed below) on the twine 18.

Front disk 30 and rear disk 40 (FIG. 2) have two pairs of radial twine slots formed in their peripheries. Each pair of twine slots consist of a narrow slot (32, 34, 42, 44) for holding the bale end of the twine while a bale is being formed, and a wide slot (31, 33, 41, 45) for receiving the needle end of the twine on completion of a bale. Slots 31, 33, 41 and 45 are made wider and shallower than the slots 32, 34, 42, 44 to facilitate laying of the twine in the clots by needle 17. The shallowness of the wide slots positions the twine in reach of knife 15 (FIG. 1). A pair of twine slots on the front disk and its companion pair of twine slots on the rear disk plus the remaining set of wide slots constitutes a cord holding stage, that is, the twine slots utilized in a single baling cycle. Thus, twine slots 31, 32, 41 and 42 and wide slots 33 and 45 represent one stage; and twine slots 33, 34, 44 and 45 and wide slots 31 and 41 represent a second stage. Wide slots 31 and 33 in front disk 30 and wide slots 41 and 45 in rear disk 40 (FIG. 2) are formed in spring sections 50, which have the qualities of a leaf spring and exert a gripping action on the tail end of the twine. The spring characteristics of sections 50 depend upon the type of metal used for the disk, the thickness of the disk, the length of the spring section, and the like.

The spring section 50 may be formed by segregating a radially projecting portion of the disk (30 or 40) on one side by a radially inwardly projecting narrow slot such as 32, 34, 42, or 44, and on the opposite side by an inwardly projecting recess 61.

Shims are used according to the amount of space or clearance desired between the keeper blade 26 and the disks 30 and 40. Thus, the shims may be of such thickness that the clearance between the keeper blade and the disks provides a firm grip on the smallest twine. With this setting the cord holder can generally be used with all calipers of baling twine, since the spring sections 50 will deflect to accommodate the twines of greater caliper as well as oversize portions of the smallest twine. On the other hand, if a particular caliper of twine is to be used at all times, the shim can be selected to provide clearance appropriate for that particular twine. When the shim thickness is selected, allowance can be made for wear of the cord holder parts by using a proportionately thinner shim.

Operation

The cord holder operates as follows: Bale 16 (FIG. 1) is formed by successive charges of hay packed by the baler plunger (not shown) and forced to the rear of the baler in the direction of the arrow 53. During this time, needle 17 is out of view. The tail end of twine 18 (FIG. 5) extends from twine slot 31 of front disk 30 under keeper blade 26, through twine slot 41 (FIG. 4), along the rear surface of disk 40, through twine slot 44 and past the keeper blade 26, through twine slot 34 on front disk 30 (FIG. 2), to the baling chamber (FIG. 1). In the baling chamber, the twine extends along the top of the bale 16, down the far end of the bale (not shown), back along the bottom of the bale (not shown), to the needle 17. Where the twine passes through twine slots 31 and 41 (FIG. 5), it jams against projection 28 on keeper blade 26, which kinks the twine. Keeper blade 26 is locked at this time, the twine in slots 31 and 41 having swung the blade about pivot pin 27, to an "over center" position whereby the force components are so arrayed as to lock the keeper blade in the position of FIG. 4. The twine, being larger than the space between the cord holder parts, also wedges between the disks and the keeper blade.

On completion of the bale, needle 17 (FIG. 1) delivers twine to the wide cord holder twine slots 33 and 45 (FIG. 2), to complete the loop of twine around the bale. The cord holder disks then rotate counterclockwise (FIG. 4) and move the twine past projection 28 on keeper blade 26 (FIG. 4), unlocking the keeper blade and freeing the twine, so that it can be worked by the billhook. This last-mentioned rotation of the disks 30 and 40 also moves both strands of twine within reach of the billhook assembly 20 (FIG. 1), which rotates and forms a knot in the twine. Further rotation of the disks 30 and 40 moves the twine past twine knife 15 (FIG 3), which cuts the twine and frees the bound bale from the twine supply. Movement of the bale towards the rear of the baling chamber causes the knot to move off the billhook. With further rotation of the disks 30 and 40, needle 17 executes its return stroke and delivers twine to narrow twine slots 32 and 42 (FIG. 4), the cord holder coming to rest in a baleforming position similar to FIG. 4.

Assuming that the clearance between the disks and the keeper blade has been selected for a particular caliper of twine and that the twine thickness remains uniform, the leaf spring sections 50 of the cord holder disks flex slightly (e.g. 0.001 inch) in gripping the twine. When the twine thickness increases for one reason or another, the spring sections 50 of the disks flex (FIG. 5) to accommodate the twine and prevent it from being cut by the cord holder. As the cord holder parts wear, the spring sections flex less than before but still exert a suitable grip on the twine because of the provisions made for wear in selecting shims.

While only the preferred mode of the present invention has been described, the invention is by no means limited to that mode, but embraces, as well, all equivalent forms that fall within the spirit and scope of the attached claims. Specific details, where described, are intended as illustrations only and not as limitations of the invention.

What is claimed is:

1. A cord holder disk, comprising: a flat disk, said flat disk including a main body portion and a cantilevered portion projecting radially from said main body portion, a radially disposed, exclusive bale end twine slot in the periphery of said disk adjacent said cantilevered portion, one side of said cantilevered portion forming a side of said bale end twine slot, a separate radially disposed, exclusive needle end twine slot formed in said cantilevered portion of said disk.

2. A twin disk cord holder unit, comprising: a frame, a shaft journalled in said frame, a pair of cord holding disks mounted in parallel, spaced relation on said shaft for rotation therewith, a keeper blade pivotally mounted on said frame and projecting into the space between said disks, one of said disks including a main body portion and a cantilevered portion projecting radially from said main body portion, a radially disposed, exclusive bale end twine slot in the periphery of said disk adjacent said cantilevered portion, one side of said cantilevered portion forming the side of said bale end twine slot, a separate radially disposed, exclusive needle end twine slot formed in said cantilevered portion of said disk.

3. A twin disk cord holder unit, comprising: a frame, a shaft journalled in said frame, a pair of cord holding disks mounted in parallel, spaced relation along said shaft for rotation therewith, a keeper blade pivotally mounted on said frame and projecting into the space between said disks, each said disks including a main body portion and a cantilevered portion projecting radially from said body portion, a radially disposed, exclusive bale end twine slot in the periphery of each of said disks adjacent said cantilevered portion, one side of said cantilevered portion forming a side of said bale and twine slot, a separate radially disposed, exclusive needle end twine slot formed in said cantilevered portion of each of said disks.

4. A twin disk cord holder unit, comprising: a frame, a shaft journalled in said frame, a pair of cord holding disks mounted in parallel, spaced relation on said shaft for rotation therewith, a keeper blade pivotally mounted on said frame and projecting into the space between said disks, each said disk including a main body portion and two cantilevered portions projecting radially from said main body portion at diametrically opposed points thereon, a radially disposed, exclusive bale end twine slot in the periphery of each said disks adjacent each of said cantilevered portions, one side of each said cantilevered portion forming a side of said bale end twine slot, a separate radially disposed, exclusive needle end twine slot formed in each said cantilevered portion of each of said disks.

5. A cord holder disk particularly characterized as having a peripheral slot projecting radially inwardly, a peripheral recess circumferentially removed from said slot and projecting generally inwardly, said recess and said slot segregating a cantilevered portion of the disk therebetween, the said cantilevered portion having a slot formed in its distended end.

References Cited by the Examiner
UNITED STATES PATENTS 3,214,206 10/1965 Sullivan et al. _____ 289—14
3,232,652 2/1966 Bonga _____ 289—14

MERVIN STEIN, *Primary Examiner.*

L. K. RIMRODT, *Assistant Examiner.*